(12) United States Patent
Del Grande

(10) Patent No.: US 7,157,714 B2
(45) Date of Patent: Jan. 2, 2007

(54) THERMAL IMAGING METHOD TO DETECT SUBSURFACE OBJECTS

(76) Inventor: Nancy K. Del Grande, 36472 Cypress Point Dr., Newark, CA (US) 94560

( * ) Notice: Subject to any disclaimer, the term of this patent is extended or adjusted under 35 U.S.C. 154(b) by 260 days.

(21) Appl. No.: 10/769,217

(22) Filed: Jan. 30, 2004

(65) Prior Publication Data

US 2004/0183020 A1 Sep. 23, 2004

Related U.S. Application Data

(60) Provisional application No. 60/444,373, filed on Jan. 30, 2003.

(51) Int. Cl.
*G01J 5/02* (2006.01)
(52) U.S. Cl. ............... 250/341.6; 250/341.1; 250/342
(58) Field of Classification Search ............ 250/341.1, 250/341.6, 342, 339.1, 339.06, 339.14, 338.1, 250/253; 382/149, 309
See application file for complete search history.

(56) References Cited

U.S. PATENT DOCUMENTS

| | | | | |
|---|---|---|---|---|
| 3,903,520 | A * | 9/1975 | Shostak | 342/22 |
| 4,257,106 | A * | 3/1981 | Auer | 250/338.1 |
| 4,978,960 | A * | 12/1990 | Newcomb et al. | 342/25 C |
| 5,339,080 | A * | 8/1994 | Steinway et al. | 342/22 |
| 5,444,241 | A * | 8/1995 | Del Grande et al. | 250/253 |
| 5,445,453 | A * | 8/1995 | Prelat | 374/43 |
| 5,471,056 | A * | 11/1995 | Prelat | 250/253 |
| 5,718,511 | A * | 2/1998 | Mundt | 374/137 |
| 5,900,833 | A * | 5/1999 | Sunlin et al. | 342/22 |
| 5,936,233 | A * | 8/1999 | Nunnally | 250/221 |
| 5,972,638 | A * | 10/1999 | Burlage et al. | 435/29 |
| 6,000,844 | A * | 12/1999 | Cramer et al. | 374/5 |
| 6,066,850 | A * | 5/2000 | Hersom et al. | 250/342 |
| 6,133,869 | A * | 10/2000 | McGill | 342/351 |
| 6,343,534 | B1 * | 2/2002 | Khanna et al. | 89/1.13 |
| 6,841,781 | B1 * | 1/2005 | Toomey | 250/341.1 |
| 6,842,534 | B1 * | 1/2005 | Paz-Pujalt et al. | 382/149 |
| 6,982,666 | B1 * | 1/2006 | Temes et al. | 342/22 |

OTHER PUBLICATIONS

Torgersen, C., et al., "Airborne Thermal Remote Sensing for Water Temperature Assessment in Rivers and Streams", Remote Sensing of Environment 76, Jul. 19, 2001, pp. 386-398.*
Leschack et al., A Dual-wavelength Thermal Infrared Scanner . . . , Geophysics, Dec. 1976, 1319-21 and 1335-36, vol. 41, No. 6.
Del Grande et al., Delamination Detection in reinforced concrete . . . , SPIE, Feb. 1999, p. 189., vol. 3587.

* cited by examiner

*Primary Examiner*—David Porta
*Assistant Examiner*—Faye Boosalis
(74) *Attorney, Agent, or Firm*—John P. Wooldridge

(57) ABSTRACT

A thermal imaging method to detect heat flows from naturally-heated subsurface objects. The method uniquely combines precise, emissivity-corrected temperature maps, thermal inertia maps, temperature simulations, and automatic target recognition to display clear, clutter-free, three-dimensional images of contained hollow objects or structures, at depths to 20 times their diameter. Temperature scans are corrected using two different infrared bands. Co-registered object-site temperature scans image daily and seasonal temperature-spread differences, which vary inversely as the object's and surrounding host material's thermal inertias. Thermal inertia (resistance to temperature change) is the square root of the product $(k\rho C)$, for thermal conductivity, k, density, $\rho$ and heat capacity, C.

25 Claims, 1 Drawing Sheet

THERMAL IMAGING METHOD TO DETECT SUBSURFACE OBJECTS

This application claims priority to U.S. Provisional Patent Application Ser. No. 60/444,373, filed Jan. 30, 2003, titled: "Thermal Inertia Imaging Method For Remotely Sensing Subsurface Objects And Structures," incorporated herein by reference.

BACKGROUND OF THE INVENTION

1. Field of the Invention

The present invention relates to thermal imaging, and more specifically, it relates to a method for detecting an underground object surrounded by a host material.

2. Description of Related Art

Dual Band Infrared (DBIR) imaging has numerous advantages over conventional thermal imaging, which utilizes only a single band. Conventional thermal imaging is difficult to interpret for three reasons:

1. It yields imprecise information that is insensitive to the subtle heat flow anomalies produced by subsurface objects.

2. It fails to distinguish between surface emissivity clutter and temperature-related heat flows.

3. Spatially-varying surface reflections (emissivity-related noise), typically equivalent to a one or two degree Celsius temperature difference, cannot be removed by using a single passive thermal IR band even when used in conjunction with another active-laser reflectance IR band.

DBIR imaging was used to detect buried land mines by exploiting temperature differences between the mine site and the surrounding soil. U.S. Pat. No. 4,005,289 describes this method, and its content is incorporated herein by reference. See N. K. Del Grande et al., "Buried Object Remote Detection Technology For Law Enforcement, in Surveillance Technologies, SPIE 1479, p. 335, 1991," which notes the difficulty of removing clutter from corrected temperature maps lacking thermal inertia diagnostics.

Thermal inertia diagnostics were used in conjunction with DBIR imaging to map flaws in heated structures (delamination gaps in bridge decks and corrosion gaps in aircraft) by exploiting thermal differences between the flaw and the structural material. U.S. Pat. No. 5,444,241, incorporated herein by reference, describes this method.

SUMMARY OF THE INVENTION

By combining precise, emissivity-corrected temperature maps, thermal inertia maps, temperature simulations and automatic target recognition, the present invention provides clear clutter-free images of heated underground objects displayed in three spatial dimensions, which 1. Characterize the subsurface-object size, shape, volume, thickness, depth, location and thermal inertia, relative to the surrounding host materials.

2. Provide clutter-free maps of subsurface objects displayed in three spatial dimensions.

3. Allow detection of deeper objects, at depths to twenty times the object width or diameter.

By combining temperature maps, obtained from imaging two different infrared wavelength bands, with inverse thermal inertia maps, obtained from imaging the day minus night, or autumn minus spring temperature spreads, the present invention exploits heat flow differences between subsurface objects and foreign-object clutter.

DETAILED DESCRIPTION OF THE INVENTION

Figure 1:
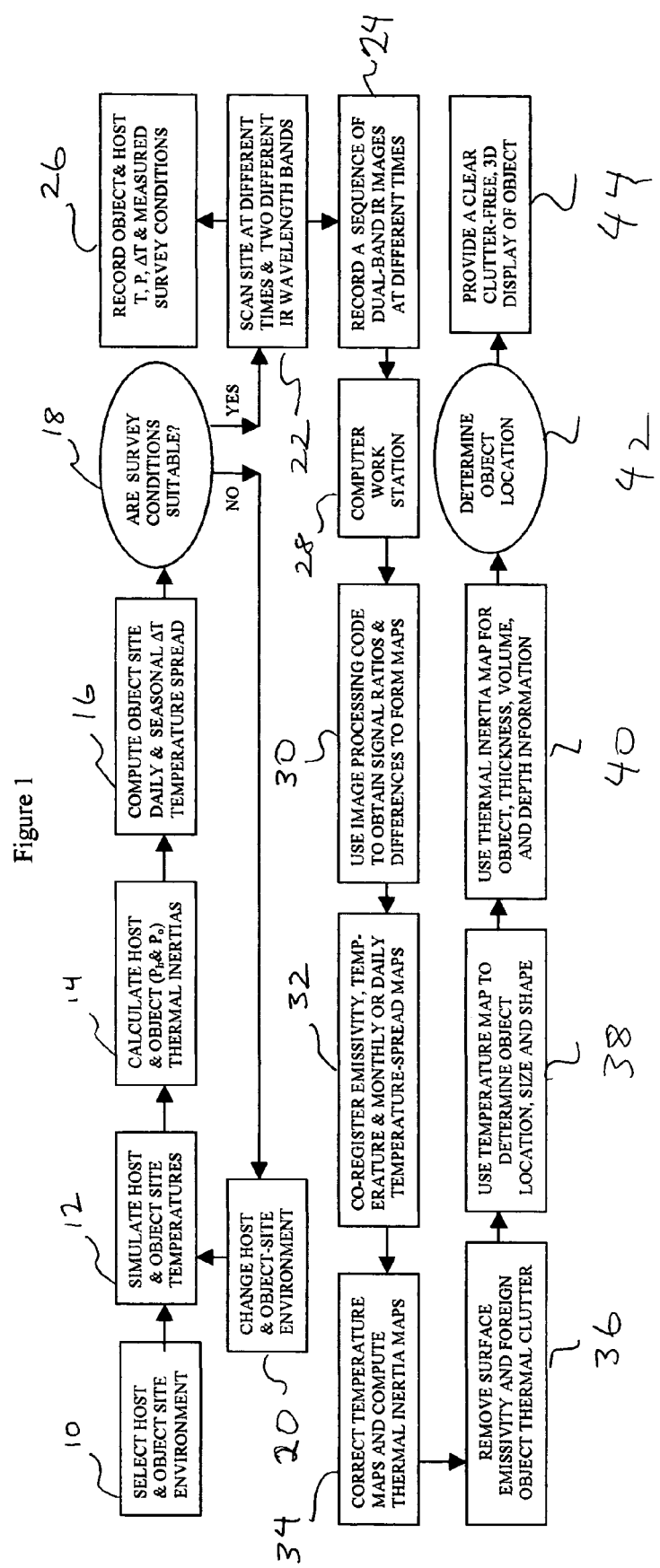
FIG. 1 shows an embodiment of the method steps according to the present invention.

A column of solid earth materials above and including a hollow object has less thermal inertia (resistance to temperature change) than an adjacent, equal-volume column of solid earth materials without the hollow object. A column of earth materials above hollow, or partially-empty objects undergo larger diurnal or seasonal temperature changes, have warmer than ambient surface temperatures at midday, during autumn, and have cooler than ambient temperatures at predawn during spring. This applies to, e.g., tunnels, caves, drains, tombs, pipelines, channels, cisterns, sewers, vessels, bunkers, and trailers.

Cumulative extraneous effects (e.g., noise produced by clutter) that can mask temperature anomalies are often an order of magnitude greater than the desired anomalous component. Appropriate corrections are therefore preferably made to facilitate interpretation.

Planck's law states that radiation emitted by a source can be related to its temperature. More precisely, Planck's law states that the radiant emittance of a surface is proportional to emissivity times absolute temperature to the power of (50/wavelength in microns).

A power law thermal model provides the physical rationale for ratioing narrow IR bands involving calculating mathematical ratios using signals with equations derived from Planck's law to produce signal ratios. These signal ratios are insensitive to the natural surface emissivity and provide enhanced thermal responsivity. The derivation of this model is given in the Appendix of LeSchack and Del Grande, "A Dual-Wavelength Thermal Infrared Scanner as a Potential Airborne Geophysical Exploration Tool," Geophysics, VOL. 41, No 6 (December 1976) P. 1318–1336, incorporated herein by reference. In accordance with an embodiment of the present invention, this model is used to determine signal ratios that are in turn used to remove surface emissivity noise.

The emissivity of surface materials is highly variable from one land area to another. However the ratio of signals at two or more wavelengths can be used to obtain highly precise surface-temperature measurements that depend very little upon emissivity variations. For example, temperature differences as small as 0.2 degrees C. can be obtained by using the present invention.

At wavelengths where the radiation has the same spectral slope as a blackbody source, i.e., an object that absorbs all radiation, the emissivity ratio variations are very small. Thus, in an aspect of the invention, quantitative temperature measurements are made using signal ratios that are calibrated against a standard blackbody source.

A typical greybody surface is an object that absorbs about 95–99% of all radiation and thus has an emissivity of less than 1. If a structure is a greybody, its respective temperatures will look alike at wavelengths of 5 micrometers and 10 micrometers.

Where the surveyed structure behaves in true greybody fashion, no matter what area is scanned, the ratio of emissivity at one wavelength divided by the emissivity at a second wavelength $\epsilon_{\lambda 1}/\epsilon_{\lambda 2}$ is constant. The ratio of two signals at differing wavelengths can then be calibrated and the blackbody temperature obtained. In one aspect of the present invention, $\lambda_1=5$ μm and $\lambda_2=10$ μm, respectively, because these are the common wavelengths that are recorded by present-day scanners.

Because the heat flow anomaly is difficult to accurately measure, corrections may be made to accurately associate the thermal anomaly with a subsurface object. Furthermore, measured surface temperatures can be inaccurate because of an emissivity factor (noise) generated by clutter. Clutter may include, e.g., shadows, tracks, stains, disturbed terrain, holes, vegetation, foreign objects, foreign materials, foreign soils, water, cool air pools and roughness variations.

Clutter of a specular nature may be identified and removed by image processing because it has a distinctive emissivity signature. The emissivity factor produced by reflected-infrared signal noise, relates to the ability of surfaces which produce clutter to emit radiant energy less than that of a black body at the same temperature and differently at one wavelength than at another. A black body is an ideal surface that absorbs and emits all radiation without reflection.

The present invention provides a method for detecting an underground object surrounded by a host material, where the detection is accomplished by using thermal inertia diagnostics, which removes both surface and subsurface foreign-object clutter. The host material is analyzed using visible, temperature and thermal inertia imagery to characterize the contrasting features of the host material from those of the object. An area of the structure is then scanned simultaneously at two or more different wavelengths of radiation to produce a time sequence of images taken at different times during day and night or at different months during the year. The time sequence of images is processed into signal ratios that are used to remove clutter.

Obtaining a temperature versus time history is important to determine the size, shape, volume, depth, type and location of the object. Despite the elimination of clutter of a reflective nature, images cannot be interpreted very easily without also studying the time history of infrared image ratios, which eliminate clutter of a thermal nature.

Other informative maps may be generated by repeating temperature survey measurements at two or more different times when the diurnal or seasonal temperature spreads provide the greatest contrast for the object and host material, compared to subsurface foreign objects and foreign materials which produce thermal-image clutter.

Thermal image clutter may be identified and removed by mapping the maximum minus the minimum temperature spread from coregistered day minus night, or autumn minus spring, temperature maps. Thermal image clutter is produced by foreign objects, and materials, such as: disturbed terrain, animal holes, roots, water, mud and rocks which resist diurnal and seasonal temperature changes differently than the sought-after object and host material.

The diurnal or seasonal temperature spread provides a unique signature to identify and remove thermal image clutter when combined with the different location, size, shape, volume, depth, and inverse thermal inertia which distinguishes foreign objects and materials from the targeted object.

Further in accordance with an embodiment of the present invention, the corrected temperature data is used to generate corrected temperature and temperature-spread maps. Corrected temperature and temperature-spread maps are color-coded images that show color patterns of conducted heat generated by objects which heat and cool at different rates relative to the surrounding materials. These patterns are distinguished from the patterns produced by foreign objects, materials and structures.

The interpretation of the images is improved by removing the clutter and thus increasing the signal to noise ratio. As a result, corrected images are formed, thereby facilitating the removal of heat flow anomalies associated with subsurface clutter.

Automatic target recognition may be used to remove reflective signal clutter from infrared signals which produce emissivity-noise, For example, maps are overlayed related to temperature, T, and emissivity ratios, R, from Equations 1, 2, 3 and 4, from U.S. Pat. No. 5,444,241, incorporated herein by reference, for dualband infrared wavelengths detected at 5 and 10 micrometers.

$$T=[I_5/I_{10}]/[I_5/I_{10}]_{Average} \tag{5}$$

$$T=[(\epsilon_5/\epsilon_{10})(T)^5]/[(\epsilon_5/\epsilon_{10})(T)^5]_{Average} \tag{6}$$

$$R=[(I_{10})^2/I_5]/[(I_{10})^2/I_5]_{average} \tag{7}$$

$$R=[(\epsilon_{10})^2/\epsilon_5]/[(\epsilon_{10})^2/\epsilon_5]_{Average} \tag{8}$$

Reflective signal clutter detected at co-registered T sites where R sites that are not within plus or minus two standard deviations from the average R value are removed and replaced with an average value. The result is a corrected temperature map.

To remove thermal signal clutter from heat flows unlike heat flows associated with the object or host material, a comparison is made of the measured relative temperature spread contrast $\Delta T_m$ with the calculated relative temperature spread contrast $\Delta T_c$. The relative temperature spread contrast is obtained by overlaying and subtracting co-registered temperature maps taken during day and night, or autumn and spring.

Calculated relative temperature spreads, $\Delta T$ vary inversely as the thermal inertia, P, or resistance to temperature spread, and directly as the fractional volume, f of the object, (o), and 1–f of the host, (h) for a column of unit area and unit volume. The relative temperature spread contrast $\Delta T$ is calculated for column 1 with the host material and the object minus column 2 with the host material only, divided by the temperature spread of the host material only column.

$$\Delta T=[(\Delta T)_o+(\Delta T)_h]/[(\Delta T)_h] \tag{9}$$

$$\Delta T=[(f/P_o)+(1-f)/P_h-1/P_h]/[1/P_h] \tag{10}$$

$$\Delta T=f[((P_h)/(P_o))-1] \tag{11}$$

All measured $\Delta T_m$ sites which do not fall within specified limits of the calculated $\Delta T_c$ of about 50 for typical hollow objects, embedded in solid host materials, at depths twenty times their diameter are removed and replaced with an average value.

An embodiment of the process steps of the present invention is provided in FIG. 1. A selection is made of a host and a subsurface object site environment (10). Note that the host and subsurface object site environment are naturally heated, not artificially heated. A survey is carried out of the host and said object site by: simulating the temperatures of said host and said object site (12), calculating the thermal inertias of said host and said object site (14), and computing the temperature spreads (e.g., twice-daily and bi-yearly) of the host and said object site (16). A determination is made whether the thermal inertia of the object site is distinguishable from that of the host (18). A change is made of the environment of the host and the object site if the temperature spread of the object site is not distinguishable from that of the host (20). The previous steps are repeated until the object site is distinguishable from that of the host (18). The host and object site are then scanned at different times with two different IR wavelengths (22) and a spatial sequence is recorded of dual-band IR images at different times (24). A record is made of the object and host temperature, thermal inertia and temperature spread (26). A calculation is made, on a computer workstation (28) using image-processing code (30) of signal ratios and differences to form temperature, emissivity-ratio and corrected-temperature maps. Emissivity, temperature and temperature-spread maps are then coregistered (32). Temperature maps and temperature-spread maps are then corrected (34). Foreign object thermal clutter is removed from the temperature-spread maps (36). Object location, size and shape are determined from the temperature maps (38). Object thickness, volume, and depth information are obtained from said temperature-spread maps (40). Object location is determined (42) and a 3D display of the object is provided (44).

A unique aspect of the present invention is the realization that thermal inertia contrast can be located for solid or semi-solid objects by detecting disturbed, moistened or displaced earth materials, which surround them. For example, this applies to subsurface walls, foundations, aquifers, ditches, burial sites, landmines, munitions, leaky pipelines and foxholes.

Another unique aspect of the present invention is the realization that thermal inertia contrast can be located for hollow, or partially empty structures by detecting undisturbed, or compacted earth materials, which surround them. For example, this applies to contained, hollow or partially empty tunnels, caves, drains, tombs, pipelines, channels, cisterns, sewers, vessels, bunkers, and trailers.

Using airborne infrared imaging from an unmanned airborne vehicle, an ancient rock-hewn drain was located under the Dome of the Rock platform, in Jerusalem, Israel. The drain image was recorded at 1:00 am on Sep. 22, 2002. Environmental conditions were optimum. The ratio of thermal inertia (resistance to temperature change), for equal volumes of limestone and air is 785 to 1. In summer, the trapped air within the drain stores excess heat, which conducts slowly to the surface. This allows the drain to be detected at depths over ten times the 3.2 meters (10.5 feet) drain width.

The shallow drain end is less than 1 meter (3.3 feet) deep, north of the Dome of the Rock. The deep end of the 136 meter (446 feet) long drain, is over 15 meters (49 feet) deep, as it descends under the Large Cistern, at the southeast corner of the Dome of the Rock platform.

Another unique aspect of this invention is the realization that the thermal contrast can be detected, between typical contained, hollow or partially-empty structures, which have approximately three orders of magnitude less thermal inertia (equal to the square root of the product $k\rho C$, for k=thermal conductivity, $\rho$=density and C=heat capacity) than the surrounding undisturbed earth. For example, this applies to contained, hollow or partially-empty tunnels, caves, drains, tombs, pipelines, channels, cisterns, sewers, vessels, bunkers, and trailers.

While particular embodiments of this invention have been shown and described, it is readily understood that numerous modifications may be made to the method that would fall within the scope of the appended claims. For example, the wavelength ranges selected for scanning may be varied. Moreover, additional corrections to images (representing surface temperature and surface emissivity) may be made depending on the environment in which a particular structure is exposed to, i.e. pollution, dust, acid and other conditions.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims

I claim:

1. A method for remotely sensing subsurface objects and structures, comprising:
   a. selecting one or more input parameters indicative of a host site environment of a host at a first location and a subsurface object site environment of a subsurface object that is beneath a surface at a second location, wherein said host site environment is naturally heated to a depth below said subsurface object;
   b. using said one or more input parameters in a heat-transfer calculation, calculating at least two sensing times, either twice daily for a daily cycle for objects no deeper than three feet, or twice yearly for a yearly cycle for objects deeper than one foot, wherein a first sensing time of said at least two sensing times is when an object-site temperature is maximum and a host-site temperature is distinguishably less, and wherein a second sensing time of said at least two sensing times is when an object-site temperature is minimum and a host-site temperature is distinguishably more; such that the temperature when said object-site temperature is maximum minus the temperature when said object-site temperature is minimum, referred to herein as the object site temperature spread, is distinguishably more than a host-site temperature spread;
   c. sensing, at said first sensing time, when said object site temperature is maximum, one or more wavelengths from each of two different thermal infrared (IR) wavebands, wherein one of said IR wavebands comprises a range from about 3 microns to about 5 microns and the other of said IR wavebands comprises a range from about 8 microns to about 12 microns, and recording a spatial sequence of dual-band IR images;
   d. sensing, at said second sensing time, when said object site temperature is minimum, said object site with said IR wavebands, and recording another spatial sequence of dual-band IR images;
   e. calculating (using an image processing code) signal ratios and differences to form temperature, emissivity-ratio and corrected-temperature maps;
   f. co-registering said corrected-temperature maps to form a first sensing time object-site corrected maximum temperature map and a second sensing time object-site corrected minimum temperature map and subtracting said second sensing time object-site corrected minimum temperature map from said first sensing time object-site corrected maximum temperature map, to form co-registered object-site temperature-spread maps with said corrected-temperature maps;
   g. correcting said co-registered temperature maps and said co-registered temperature-spread maps by removing and replacing apparent thermal patterns with spectral differences in either of said thermal IR wavebands;

h. removing host-site irregularities and foreign-object thermal clutter from said temperature-spread maps;

i. determining object location, size, shape and orientation from said temperature maps;

j. determining object, thickness, volume, and depth information from said temperature-spread maps; and k. providing a 3D display of said object-site temperature maps and said object-site temperature spread maps.

2. The method of claim 1, wherein said host site environment and said subsurface object site environment are located from data selected from the group consisting of aerial photos, satellite imagery and site maps that include information selected from the group consisting of surface conditions, soil type, vegetation, geology, meteorology and topography.

3. The method of claim 1, wherein said host site environment is selected from the group consisting of rock, pavement, concrete, gravel, sand, soil, mud, and water.

4. The method of claim 1, wherein said thermal clutter is selected from the group consisting of a shadow, a track, a stain, disturbed terrain, a hole, vegetation, a foreign object, foreign material, foreign soil, water, cool air pools and roughness variations.

5. The method of claim 1, wherein the step of simulating the temperatures of said host and said object site is carried out with an energy budget equation.

6. The method of claim 5, wherein said energy budget equation inputs a plurality of environmental variables to calculate the surface temperature of said object site.

7. The method of claim 1, further comprising removing surface clutter by separating temperature data from spatially-varying surface-emissivity data, to obtain true, time-varying temperature-difference values at scanned points of said object area, from a plurality of points in space and time.

8. The method of claim 1, wherein said host-site irregularities and foreign-object thermal clutter is removed by separating first thermal inertia data for normal, undisturbed host and targeted-object materials, from anomalous thermal inertia data for disturbed host or foreign-object materials, characterized by their depths, volumes and physical features, unlike the targeted object and host material, to obtain true, spatially-varying thermal-inertia differences which characterize the subsurface targeted-object site, from a plurality of points in space and time.

9. The method of claim 8, wherein said first thermal inertial data is separated from said anomalous thermal inertia data by using the following temperature ratio equation to obtain a temperature map:

$[SWB/LWB] = [(\epsilon_5/\epsilon_{10})(T/T_o)^5];$ $(T/T_o)^5 = (S/S_{av})/(L/L_{av})$, where S is the short wavelength intensity, $S_{av}$ is the average value of the pixels in S, L is the long wavelength intensity and $L_{AV}$ is the average value of the pixels in L.

10. The method of claim 9, wherein said first thermal inertial data is separated from said anomalous thermal inertia data by using the following emissivity-ratio equation to obtain an emissivity ratio map:

$[(LWB)^2/(SWB)] = (\epsilon_{10})^2/(\epsilon_5) = \epsilon;$ $E\text{-ratio} = (L/L_{av})^2/(S/S_{av}).$ 11. The method of claim 10, wherein determining whether an object exists under said surface of said second location comprises comparing said temperature map with said emissivity-ratio map to observe heat flow anomalies generated by the subsurface object, host material or foreign-object, and remove unrelated emissivity, or reflected signals, forming clutter.

12. The method of claim 10, wherein diurnal or seasonal temperature spread, for said corrected temperature maps, is used to distinguish bulk thermal properties (such as thermal inertia) of said object within the host material, from bulk thermal properties (such as thermal inertia) of an equal volume of said host material.

13. The method of claim 1, wherein said sensing comprises taking images at specified times, based on simulations carried out with an energy budget equation.

14. The method of claim 13, wherein said images are taken before sunset and before dawn to detect said objects that are no deeper than three feet.

15. The method of claim 13, wherein said images are taken during the summer or autumn and during the winter or spring to detect said objects that are deeper than one foot.

16. The method of claim 1, wherein said sensing is performed with at least the same number of detectors as the number of sensed wavelengths.

17. The method of claim 1, wherein said scanning occurs for at least two different infrared wavelength bands comprising a long wavelength band ranging from 8–12 micrometers and a short wavelength band ranging from 3–5 micrometers.

18. The method of claim 1, wherein said subsurface objects are selected from the group consisting of hollow, or semi-empty objects and structures which typically have less thermal inertia (resistance to temperature change) than their surroundings of undisturbed earth.

19. The method of claim 1, wherein said subsurface objects are selected from the group consisting of solid, or semi-solid objects and structures which have more thermal inertia (resistance to temperature change) than their surrounding host material.

20. A thermal imaging method to detect subsurface objects or air gaps, comprising:

using an energy budget equation to calculate a first imaging time and a second imaging time;

imaging two different infrared (IR) wavelength bands a at said first imaging time from a first location and a second location to obtain a first temperature map;

imaging said two different IR wavelength bands a at said second imaging time from said first location and said second location to obtain a second temperature map;

combining said first temperature map and said second temperature map to obtain a first temperature spread at said first location and a second temperature spread at said second location; and comparing said first temperature spread with said second temperature spread to determine whether an object or structure is located beneath said first location or said second location.

21. The method of claim 1, wherein said subsurface objects and structures comprise a fault located in a structure selected from the group consisting of a bridge deck, a pipe, a sewer, a retaining wall, a building structure and a semiconductor chip.

22. The method of claim 1, wherein said subsurface objects and structures comprise at least one landmine.

23. The method of claim 1, wherein said subsurface objects and structures comprise a water resource.

24. The method of claim 1, wherein said subsurface objects and structures comprise an underground tunnel.

25. The method of claim 1, wherein said subsurface objects and structures comprise corrosion.

* * * * *